Jan. 21, 1958  F. KOZIKOWSKI ET AL  2,820,860
DELAYED CIRCUIT CLOSERS

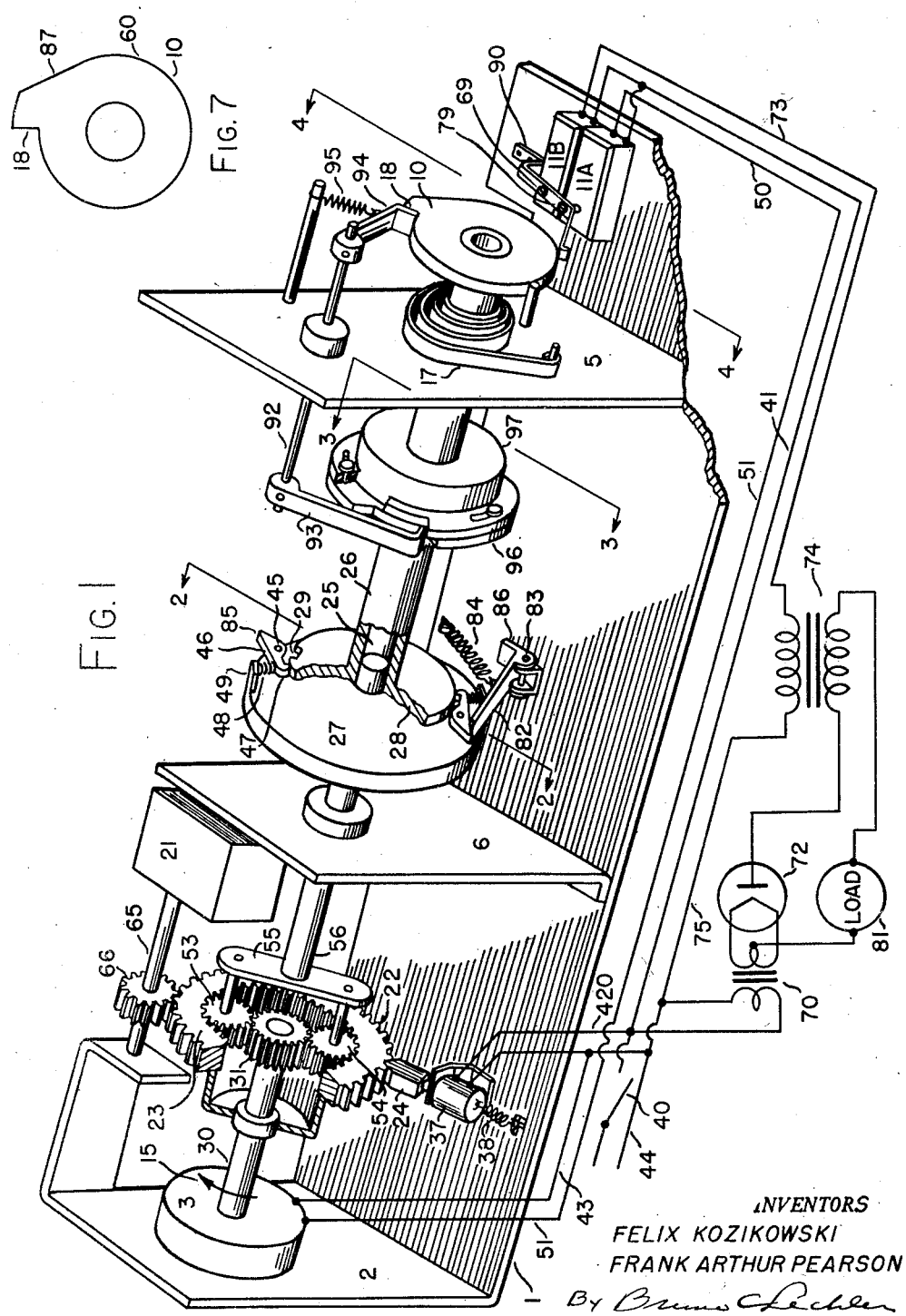

Filed Jan. 5, 1954  2 Sheets-Sheet 2

INVENTORS
FELIX KOZIKOWSKI
FRANK ARTHUR PEARSON
By Bruno C Lechler
Patent Attorney United States Patent Office 2,820,860
Patented Jan. 21, 1958

2,820,860

DELAYED CIRCUIT CLOSERS

Felix Kozikowski and Frank Arthur Pearson, Moline, Ill., assignors to Eagle Signal Corporation, Moline, Ill., a corporation of Massachusetts Application January 5, 1954, Serial No. 402,244

15 Claims. (Cl. 200—39)

The invention relates to devices that automatically restore current to a circuit after current failure in the supply lines has opened the circuit with a delay after current returns to the supply lines after the lapse of a time interval that begins when the current is restored to said supply lines. More specifically the invention relates to such devices in which this lapse of time is related to the length of time the current on the supply lines was interrupted.

In devices of this latter type hitherto known, such as the delayed circuit closer invented by Felix Kozikowski and shown in Patent 2,792,468, granted May 14, 1957, this lapse of time is directly proportonal to the length of time the current was interrupted.

It will be understood that if in any of these devices and also in the invention if the interruption exceeds some set value, the lapse of time after current comes back on the supply line before the circuit is restored will be the same as for a current interruption equal to the set value. Also in some instances the circuit is not opened if the current interruption to the supply lines is of a very short duration.

In the present invention the lapse of time before the circuit is restored is also related to, but not proportional to, the length of the interruption of current to the supply lines. The lapse of time consists of the total of a fixed additional time interval plus an interval proportional to the length of the current interruption.

The operation of the invention will be better understood by describing its adaptation to one use of the invention, electronic devices having a filament which is to be heated before the load circuit, which applies current to the plates, is closed. In such applications of the invention the filament is connected directly to the supply lines, so starts to heat up as soon as the current becomes available. Let us assume that the electronic device is already in operation and that current fails. Immediately on current failure a timing operation is initiated. As soon as this timing device starts to operate, a motor switch is closed that will, upon current restoration, carry the timing device back to its initial position when the motor switch will be opened.

Since in such an application it is desired to restore the load switch as soon as the filament has been heated, provision is made not to open the load circuit if the current interruption is very small—let us assume less than 5 seconds. Five seconds or less will be referred to as the "permissible interruption."

If the current interruption exceeds this permissible value, such as 5 seconds, the load switch is opened and the electronic device is put out of operation.

In the delayed circuit closers hitherto known, if the current interruption lasted 7 seconds, 2 seconds beyond the "permissible interruption," it took some multiple of 2 seconds to restore the circuit after current is restored to the supply lines. If interruption lasted nine seconds it took twice as long, being the same multiple of 4 seconds.

By contrast, the invention adds time by some fixed interval to the time needed to restore the circuit. By way of illustration, assume this to be 10 seconds. Thus, with a 7 second interruption, the time required to restore the circuit would be a multiple of 12, not 2 seconds; and with a 9 second interruption, a multiple of 14, not 4 seconds.

The multiple is usually one, that is for each second of interruption after the load circuit is opened plus the added time interval, one second is required to restore the circuit. However the device can operate on some other multiple in which it may take one and a half or two seconds instead of one second to retrace the space covered during a second of current interruption.

There will be some set value for an interruption, let us say 60 seconds in addition to the permissible 5 second interruption, which the timing device does not take into account in determining the time of interruption to be taken into account.

Thus, in this example, if the current were off 4 hours, the time to restore the circuit would be based on 60 plus 5 seconds just as it would have been for a 65 minute interruption.

Usually in known types of apparatus of this kind an element rotates in one direction at a controlled speed after current interruption, thus measuring the interruption time. This direction of movement will be called backward, and upon current restoration the same element is rotated forward to its initial position at some controlled speed. This speed may be the same as the backward speed or it may be a different constant speed. Thus the time for restoration is proportional to the time that elapses after the current fails.

By contrast, in the invention the element that normally rotates backward at a controlled rate of speed is freed from the speed control and driven very rapidly by a spring to move through a fixed angle after which it reengages with the speed control and functions in the same manner as in conventional delayed circuit closers.

When the element that is normally rotating backward at a controlled speed is released and rapidly driven by a spring and then reengaged to again move at a controlled speed, there is a severe impact. Many of these devices are used in large numbers on planes or balloons where weight is an important consideration. With the wide changes in ambient temperature which are there encountered the friction coefficients of moving parts and the consistency of lubricants is effected, calling for relatively strong springs to give positive action. These two requisites—light parts to reduce weight and strong springs to give rapid and positive acceleration giving a sharp impact, are in conflict. The normal expedient, making the parts heavier and more substantial is not permissible.

Accordingly the invention provides means for stopping the moving element after it has been released and just before it has reached the point where it is to reengage with the controlled speed device, then again releasing it to move into engagement. Since this is only a short movement, the spring does not have a chance to build up the speed that would cause a severe impact due to the inertia of the element.

The object of the invention is to close a circuit that has been opened by current interruption with a time delay after current is restored equal to a time interval that equals a fixed time to which has been added additional time that is proportional to the length of time the circuit was opened by the current failure.

Another object of the invention is to close a load circuit that has been opened by current interruption with a delay after current is restored that equals a fixed time to which additional time has been added that is proportional to the length of time the circuit was opened by current failure by providing an element that starts moving backward away from a load switch which it had held closed, thereby opening the switch; providing means for moving the element back through a fixed additional distance, then continuing to move the element backward at a fixed rate until current is restored, then moving the element forward by a motor at a fixed rate until the load switch is again closed, then stopping the motor.

Another object of the invention is to close a load circuit that has been opened by current interruption with a delay after current is restored that equals a fixed time to which additional time has been added that is proportional to the length of time the circuit was opened by current failure by providing an element that starts moving backward to first condition a switch that will on restoration of current move the element forward and then, after a short lapse of time, opening another switch which the element had held closed, providing a motor for moving the element back through a fixed additional distance, then continuing to move the element backward at a fixed rate until current is restored, then moving the element forward at a fixed rate until the load circuit is again restored and the motor switch opened.

Another object of the invention is to close a circuit that has been opened by current interruption in supply lines after current is restored with a delay equal to a time interval that equals a fixed time after current is restored to the supply lines to which additional time has been added that is proportional to the length of time the circuit was held open by current failure by providing an element that on current interruption starts turning backward first conditioning a switch that will on restoration of current move the element forward and then, after a short lapse of time opening another switch which it had held closed thereby opening the circuit, providing means for moving the element back through a fixed additional angle, then continuing to move the element backward at a fixed rate until current is restored to the supply lines, then moving the element forward at a fixed rate until the circuit is again closed, then continuing to move the element forward until the switch controlling the forward movement of the element is opened.

Another object of the invention is to avoid injury to a rapidly rotating part or the stop against which the rotating part is to strike by providing a bumper that stops the rotating part just before it reaches engagement with the stop, then removing the bumper and allowing the rotating part to rotate into engagement with the stop at slow speed.

Another object of the invention is to avoid injury to a rapidly rotating part carrying an engaging surface that is to be stopped in a precise angular position by engagement with a fixed stop wherein the rotating part is provided with a movable element carried by the rotating part and having limited freedom of movement relative to the rotating part, the rotating part provided with an abutment, a bumper provided that can move into and out of the path of said abutment and the movement of the bumper out of the path of the abutment after thus stopped the rotating part is controlled by the position of the movable element on the rotation part, after which the engaging surface moves into contact with the fixed stop.

Another object of the invention is to avoid injury to a rapidly rotating part carrying an engaging surface that is to be stopped in a precise angular position by engagement with a fixed stop wherein the rotating part is provided with an abutment, a bumper provided which can move out of the path of the abutment, a stressed spring provided to move the bumper, the rotating part provided with a circular surface preventing the spring from moving the bumper out of the path of the abutment until just before the abutment engages the bumper, the inertia of the bumper and its associated parts utilized to delay the movement of the bumper out of the path of the abutment long enough for the rotating part to come to a complete stop against the abutment after which the engaging surface is moved into contact with the fixed stop.

Figure 1 shows the invention in diagrammatic perspective and also the electric circuits.

Figures 2A, 2B, 2C, all show the parts in a vertical section taken along lines 2—2 in Figure 1.

Figures 3A, 3B, 3C, all show the parts in vertical section taken along lines 3—3 in Figure 1.

Figures 4A, 4B, 4C, all show the parts in a vertical section taken along lines 4—4 in Figure 1.

Figures 2A, 3A, 4A, each shows the parts in their relative position when the load switch is closed.

Figures 2B, 3B, 4B, each shows the same parts in their relative position when the load switch is open and the cam which has been released has jumped back toward its new position and has come to a stop against the bumper that absorbs the force of the impact.

Figures 2C, 3C, 4C, each shows the same parts after the bumper has been moved out of the way and the parts are free to move again and to complete the travel to their new position.

Figure 7 shows an end elevation of the cam that actuates the switches.

Figure 2A:
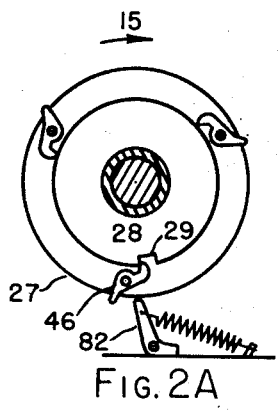

In the drawings, 1 represents a base having a wall 2 at one end that supports a synchronous motor-driven speed reducer 3. When in operation, the motor-driven speed reducer turns a shaft 30 in the direction of the arrow 15 that will be referred to as forward. In such speed reducers the shaft 30 cannot be turned backward when the motor is not running. The shaft 30 turns a sun pinion 31 in a planetary gear unit generally indicated at 22. The ring gear 23 which has an additional set of teeth on the outside is held locked against rotation by a pawl 24 engaging the outside teeth only while the solenoid 37 is energized. The pawl is drawn back out of engagement by spring 38 allowing the gear 23 to move as soon as the current in the line ceases.

The planetary pinions 53 and 54 are carried by the spider 55 attached to the shaft 56 supported by a bearing carried by wall 6. The teeth on the outside of ring gear 23 engage a pinion 66 on a shaft 65 that can only turn at a speed determined by an escapement device 21.

The parts thus far described are the same, and bear the same numbers, as the corresponding parts in pending application 225,629. That application described in detail how, when the apparatus is connected to an electric current the motor driven speed reducer turns shaft 30 forward in the direction of arrow 15 at a fixed speed until the parts arrive at a particular position and now, on current failure, the pawl 24 is withdrawn allowing the parts to be turned backward at a speed determined by escapement 21.

The end of shaft 56 turns freely in the axial bore 25 of shaft 26. Shaft 56 carries a disc 27 and shaft 26 carries the adjacent disc 28. The disc 28 has one notch 29 on its circumference and the disc 27 carries a number of pins 45 equally spaced about the shaft 56 and each of these pins carries a pawl 46. The nose 47 of one pawl is shown in Figure 1 about to engage the notch 29 and when it gets to that position the shafts 56 and 26 move together. A compression spring 48 bearing against an abutment 49 carried by the disc 27 and the nose 47 of the pawl 46 pushes the nose of each pawl against the edge of the disc 28. Only three equally spaced pawls are shown in this embodiment of the invention but the invention can embody any number of such equally spaced pawls.

As the shaft 56 is turned forward in the direction of arrow 15, whichever pawl is in notch 29 will pass a tripper 82 hinged to the base 1 at 83.

A spring 84 allows the tail 85 of the pawl to push the tripper 82 out of the way stretching spring 84. However when the shaft 56 is turning in the opposite direction, the tripper will disengage the pawl 46 from the notch 29. This is because the tripper has an extension 86 on the other side of hinges 83 that bears against the base when the tripper turns in the one direction. Since the tripper 82 cannot move out of the way, the tail 85 of the pawl is turned about pin 45 lifting the nose 47 out of the notch 29.

The shaft 26 is supported by a bearing on wall 5 extending up from the base 1. A spiral spring 17 has one end anchored to the wall 5 and the other end attached to the shaft 26. This spring is prestressed and as the shaft 26 moves in the direction 15 it is further stressed. The spring tries to turn the shaft 26 in a direction opposite to arrow 15 but is normally restrained from doing so because one of the pawls 46 is engaging a notch 29 on the disc 28 carried by the shaft 26. So the spring is restrained by whatever limits the motion of disc 27 carried by shaft 56. But when the pawl is lifted out of the notch, the spring is free to turn the shaft 26 at an unrestrained speed.

In the basic form of the invention the shaft 26 will again come to a stop when the notch 29 engages the nose of the next pawl 46 after the shaft has been thus released.

The shaft 26 carries a cam generally indicated at 10 that is shown in detail in Figure 7. This cam has a circular surface 60 from which a long gradual slope 87 rises and a radial step 18. A switch actuating spring 90 is supported on the base 1 and as the cam 10 turns in the direction 15 in Figure 1, the arm engages slope 87 and successively actuates microswitches 11A, 11B. Screws 79, 69 on spring arm 90 are provided and may be set so that as the cam 10 moves in the direction 15 switch 11B, which is the load switch, is closed first. Then, as the cam continues the arm 90 opens switch 11A which supplies current to motor 3.

The invention may be used in connection with any circuits in which one circuit is closed immediately on current restoration after a current interruption while the other circuit is either restored or opened after a time interval related to the length of the interruption.

In the illustration, current normally flows over lines 41, 44. The current may be interrupted by opening switch 40 leading to line 41.

Whenever switch 40 is closed and current available, current flows over 420 causing solenoid 37 to overcome spring 38 and to bring pawl 24 into contact with the outer teeth on gear 23. Current also flows to a transformer 70 putting current on the filament in a radio tube 72. Line 41 leads to the two switches 11A and 11B. Switch 11A controls the motor 3 and switch 11B feeds current to a transformer 74. This places current on the plate of tube 72 and load 81. The screws 79 and 69 are so adjusted that as the cam 10 turns in direction 15 switch 11B which is normally open is closed first and after a short interval of additional travel of cam 10 the normally closed switch 11A is opened.

The circuits are the same as in the previous application referred to, except that line 41 is connected to lines 50 and 73 by the two separate switches 11A, 11B instead of by the single switch arm 42.

When the current has been on the supply lines for some time the cam 10 will have advanced from the position shown in Figure 1 until slope 87 has depressed the arm 90 and switch 11A has cut the current off motor driven speed reducer 3 and switch 11B has placed the current on the electronic device plate circuit 73. The spring 17, is preloaded and also wound up and the pawl 24 is holding the ring gear 23 against rotation since current is on the solenoid 37.

When current fails, the solenoid releases the gear 23 and the spring 17 starts turning the shaft 26 and the cam 10 backward in the opposite direction to arrow 15. As the cam turns backward switch 11A first closes the circuit to the motor 3, but as there is no current at the moment, this is only a preconditioning move. After the cam has turned further and allowed the arm 90 to rise further, the switch 11B opens and puts the electronic device out of service.

When current failed and the spring 17 turned the shaft 26 backward, whichever pawl 46 was engaged turned shaft 56 backward at a rate determined by the escapement 21. This determines the speed of cam 10 until the pawl that is engaged passes tripper 82 in a direction opposite to 15 and is thereby released.

The spring 17, now unrestrained, turns the shaft 26 in the direction opposite to arrow 15 at an increasing speed until the notch 29 reaches the next pawl.

After notch 29 engages this, the shaft 56 and shaft 26 again move together and both are turned further by spring 17 at a rate determined by the escapement 21. When the current is restored, the time required to turn the cam 10 back to the position where switch 11B closes depends on the length of time the current was interrupted. The interruption allowed the spring 17 to turn the cam backward and restoration will require the time needed to retrace the angular distance between a pair of pawls 46 as well as the distance the cam moved back under control of the escapement.

When the cam 10 moved backward the slope 87 moved slowly away from arm 90 first to close the motor switch 11A so that when current again appears the motor will start, and then to open the load switch 11B.

The angular correlation of cam 10 and the notch 29 in disc 28 and the position of tripper 82 are such that about the time that the cam has moved far enough for the slope 87 to have moved the arm 90 to the point where the load switch 11B is about to open, the pawl 46 that has connected discs 27 and 28 is tripped.

In the preferred form of the invention, additional parts about to be described, are provided to avoid injury to the pawls 46 or the edges of notch 29 by the impact which results when the shaft 26 and the parts it carries have been accelerated by the spring 17 after one of the pawls 46 has been released and the parts are brought to a sudden stop by engaging another pawl.

A bumper is provided that stops the shaft 26 just before it has turned through the angle between successive pawls 46. After the bumper has stopped the shaft 26, the shaft is released to complete the balance of the angle between pawls 46 without having the opportunity to pick up speed.

To prevent the notch engaging a pawl while travelling at speed, a shaft 92 is supported in a bearing on a wall 6. An arm 93 is keyed to this shaft; also the bumper 94. A spring 95 seeks to draw bumper 94 upward in Figure 4A and to rotate the shaft 92 in counterclockwise direction in Figure 3A.

Figure 5:
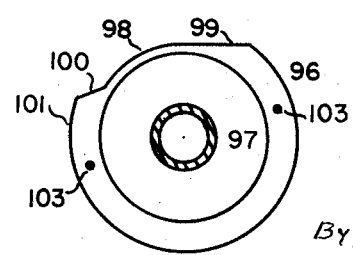
Figure 5 is similar to 3C except that the ring has been removed from the supporting disc.

The shaft 26 carries a disc 96 a side view of which is shown in Figure 5.

This disc has a central hub 97, circular depressed section 98 and rises 99 and 100. The rise 100 is so placed that the arm 93 is free to move to the base of the rise as shown in Figure 3B at the time the bumper 94 comes into contact with a step 18 on cam 10 also carried by shaft 26 as shown in Figure 4B.

Figure 3A:
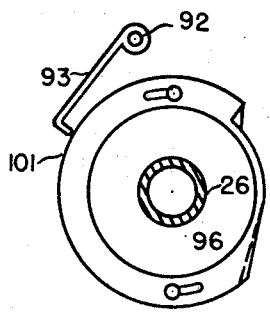
Figure 4A:
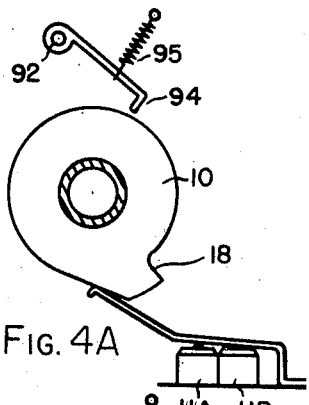
Figure 3B:
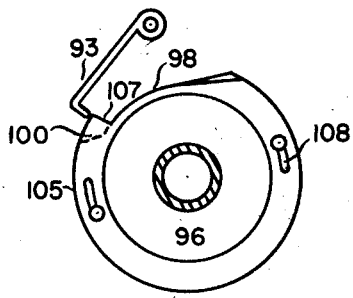
Figure 4B:
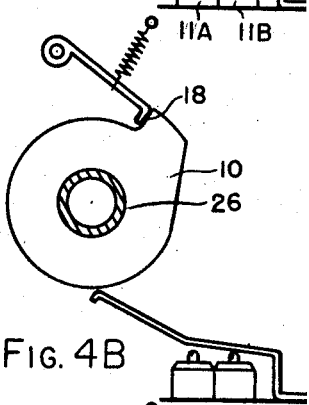
Figure 2C:
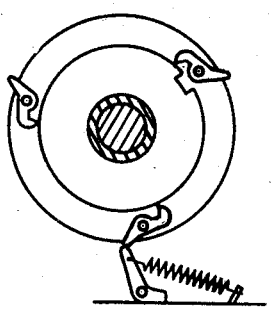

Thus, referring to Figures 3A and 4A, the raised portion 101 of disc 96 is holding arm 93 up and preventing the spring 95 moving the bumper 94 out of the way of step 18 on cam 10 although that step is in that position some distance away from the bumper 94.

Figure 3C:
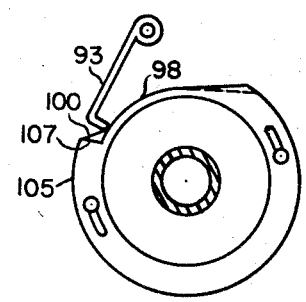
Figure 4C:
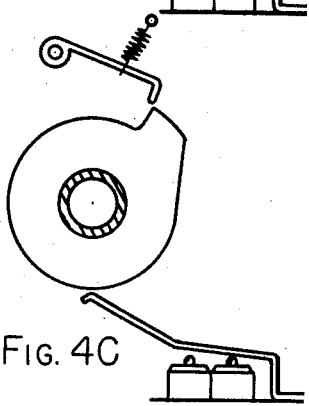

Figures 3C and 4C show discs 96 and 10 in such positions that the spring 95 has been able to elevate the bumper 94 and to move arm 93 in toward portion 98 of disc 96.

The three drawings 2A, 3A, 4A show the discs 27, 28, 96, and cam 10 in corresponding angular positions. These drawings show the positions in which the parts shown assume when current is on the lines 41 and 44 and the load switch 11B is held in position to energize the load circuit and the switch 11A has cut current off the motor. The nose 47 of the pawl 46 carried by disc 27 engages notch 29 on disc 28 carried by shaft 26. These views show the parts in the position they assume after current has been on the line for some considerable time.

When the current fails, the preloaded spring 17 which was wound up when the shaft 26 moved in the direction 15, turns the shaft 26 and cam 10 and disc 28 in the reverse direction to arrow 15. Through one of the pawls 24 this motion is transmitted to disc 27. The speed of the parts is slow, being controlled by the escapement 21 in the manner described.

Referring more especially to Figure 2A, it will be seen that the parts only move through a small angle in the direction opposite to arrow 15 until the lower pawl 46 comes into contact with tripper 32 that releases that pawl from notch 29.

The spring 17 now moves the shaft 26 which carries discs 28, 96 and cam 10 at an increasing speed until, in the basic form that has been described, the notch 29 engages another pawl 46 on the upper right side of Figure 2A after which the parts again move at slow speed under control of the escapement.

The invention in its basic form may then be described as follows:

The parts are normally in the position shown in Figures 2A, 3A, and 4A and when current fails the pawl 24 in Figure 1 is released and the parts attached to shaft 26 in the three views all turn counter clockwise until pawl 46 allows the disc 28 and cam 10 to suddenly move to a position where the next pawl 46 in Figure 2A engages notch 29.

When current is restored the parts move slowly in the direction of arrow 15 until cam 10 approaches the position shown in 4A. Then the switch 11B is first closed and after that switch 11A is opened. It is obvious that the parts driven by spring 17 acquire considerable inertia while they are accelerating and that the impact on pawl 46 and notch 29 requires that the parts be made substantial.

In this description of the basic invention it may be assumed that the parts carried by shaft 26 that are not named, and the bumper, do not exist.

Numbers of such devices are used extensively in planes and balloons, and the weight of the entire apparatus shown in Figure 1 may have to be less than one pound. To make the parts light and still have the positive action that permits the parts to function under great changes in the ambient atmosphere temperature, a modified form of the invention may be employed.

The modified form of the invention is designed to permit making the parts light by eliminating the impact of the moving parts against pawl 46 when the notch 29 engages the nose 47 of a pawl 46.

Figure 2B:
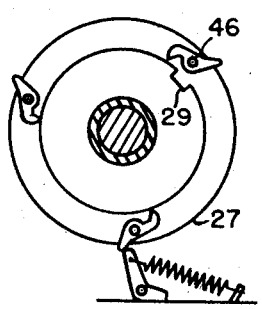

The parts are so proportioned that after the pawl is released in Figure 2A the step 18 engages the bumper 94 as shown in Figure 4B. When that happens the notch 29 has not quite reached the nose of a pawl 46 as shown in Figure 2B. The spring 95 could move the bumper 94 out of the way of step 18 on cam 10 were it not that arm 93 on the same shaft 92 is prevented from moving into contact with surface 98.

By reference to Figures 3A, 4A, 3B, 4B, it will be noted that as the parts turn from the positions shown in Figures 3A, 4A to those of 3B, 4B, the arm 93 bearing on surface 101 of disc 96 prevents the spring 95 from moving the bumper 94 out of the way of the step 18 until the step has come very close to the bumper. As shown in Figure 3B, when the step is in engagement with bumper 94 the rise 100 on disc 96 has just moved out of the way of arm 93, so that spring 95 could move the bumper, were it not that ring 102, to be described, interferes.

The disc 96 shown in Figure 5 carries two pins 103.

Figure 6:
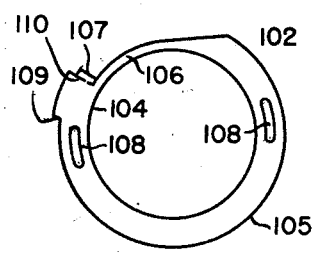
Figure 6 shows the ring.

The ring 102 shown in Figure 6 has an inner edge 104 that rides on the hub 97 of the disc 96 and two slots 108 through which pins 103 extend.

This ring has a circular portion 105 and a recessed portion 106. The step 107 may be so related to the slots 108 that when the disc 96 is accelerating and the ring lags, the parts then being in the position shown in Figure 3B, the arm 93 cannot move into contact with surface 98, but if the disc 96 is stopped, or sharply accelerated, inertia will continue to rotate the ring as far as the other end of the slots permit into the position shown in Figure 3C where the step 107 is out of the way of arm 93 which can now be moved by spring 95 which is trying to lift bumper 94.

When the shaft 26 in Figure 3A starts to turn counter clockwise toward the position shown in Figure 3B under the accelerating force of spring 17 the ring 102 lags and it is turned by the pins 103 bearing against the ends of slots 108 shown in Figure 3B. In this position the raised portion 105 of the ring 102 is in the position shown in Figure 3B extending beyond rise 100 on disc 96 and preventing the arm 93 and bumper 94 moving from the position shown. The step 18 of cam 10 meets up with bumper 94 as shown in Figure 4B.

This stops the disc 96 and cam 10 suddenly and the ring 102 continues to rotate the length of slots 108. That moves the step 107 on ring 102 from the position shown in Figure 3B to that of Figure 3C. That allows the spring 95 to move bumper 94 and arm 93 in such manner that the bumper 94 releases step 18 on cam 10 as shown in Figure 4C.

When the shaft 26 and the discs come to rest against the bumper 94 the notch 29 in Figure 2B was almost up to the nose of a pawl carried by disc 27. Now, when the same arm and bumper assume the positions of Figures 3C and 4C the spring is free to rotate shaft 26 and the disc 28 enough to bring notch 29 into engaging position with nose of pawl 24. Since the distance the parts move after the release of the bumper is small, there will be no sharp impact.

In still another modification, of the invention, the outer surface 105 of the ring 102 has a raised portion 109 as shown in Figure 6 and the step 107 of the ring is moved back to the dotted line 110.

Referring to Figure 3B, at the moment the cam 10 engages the bumper as shown in Figure 4B the ring, though in its lagging position shown in Figure 3B already clears the arm 93 and spring 95 can move the bumper out of the path of the cam 10.

The cam is nevertheless positively stopped because the shaft 92 and bumper 94 and arm 93 have enough inertia that, after the bumper engages the cam, it will come to a complete stop by the time the spring 95 has accelerated the parts mentioned enough to move arm 93 from the position in Figure 3B to 3C and the bumper from the position shown in Figure 4B to that of Figure 4C.

The arm 93, as the parts move from position 3A to 3B engages the slightly raised portion 109 of the ring and drags it into the position shown in 3B without depending on the inertia of acceleration. Thus the dragging of arm 93 on the ring assists the positive operation of the device.

We claim:

1. A delayed circuit closer, having in combination, a current source, a load circuit, a switch controlling the flow of current from said source to said load circuit, a movable element which in its first position closes said switch, means becoming effective upon failure of said current source that moves said element at a controlled rate away from its initial position thereby opening said switch, means becoming effective when the element has moved a preset distance that instantaneously moves said element a fixed additional distance, means becoming effective on revitalization of said current source to move said element at a controlled rate back to its initial position.

2. A delayed circuit closer, having in combination, a switch controlling a load circuit, a cam which in its first position closes said switch, means responsive to current failure to permit said cam to be moved away from its initial position, means adapted to move the cam away from its first position thereby opening said load circuit and to continue moving the cam at a fixed rate, means adapted to move the cam away from the switch a fixed additional distance when the cam moves back past a present point, means adapted to move the cam back toward its first position at a second fixed rate becoming effective on current restoration.

3. A delayed circuit closer, having in combination, a switch controlling a load circuit fed from power lines, a cam which in its initial position holds said switch closed, spring means adapted to move said cam backward away from said switch allowing it to open, an escapement permitting the cam to move backward only at a fixed rate, means permitting the cam at a certain point of its backward travel to instantaneously move back a fixed additional distance, means including a solenoid held actuated while current is on the power lines that permits said spring to move said cam only while there is a power failure, means becoming effective upon current restoration to said power lines for moving said cam forward to its initial position at a fixed rate and closing said load circuit when the initial position of the cam is reached.

4. A delayed circuit closer, having, in combination, a switch controlling a load circuit fed from power lines, a cam which in its initial position holds said switch closeed, spring means adapted to move said cam backward away from said switch allowing it to open, an escapement permitting the cam to move backward only at a fixed rate, means including a solenoid held actuated while current is on the power lines that permits said spring to move said cam only while there is a power failure, means adapted to disconnect said escapement to permit said spring to move the cam backward a fixed additional distance, when said escapement is reengaged, means becoming effective upon current restoration to said power lines for moving said cam forward to its initial position at a fixed rate and closing said load circuit when the initial position of the cam is reached.

5. A delayed circuit closer, having in combination, a switch controlling a load circuit fed from power lines, a cam carried by a shaft which in its initial position holds said switch closed, spring means adapted to turn the shaft and the cam backward away from its initial position opening said switch, an escapement mechanism controlling the rate at which said cam turns away from its initial position, means for disconnecting said escapement mechansm from said shaft for an instant permitting said spring to move the shaft and cam through an additional arc of a fixed number of degrees after the shaft has been turned through a fixed angle under control of the escapement mechanism, motor driven means adapted to turn the cam forward at a fixed rate to its initial position to close said load switch that start to operate when the current is restored to the power lines.

6. A delayed circuit closer, having in combination, a switch controlling a load circuit fed from power lines, a cam carried by a shaft which in its initial position holds said switch closed, spring means adapted to turn the shaft and the cam backward away from its initial position opening said switch, a second shaft, means of engaging said first and second shafts, an escapement mechanism controlling the speed of rotation of said second shaft in one direction, a constant speed motor adapted to drive said second shaft forward when current is restored to the main circuit, means becoming effective when the spring has moved the first shaft and cam a fixed distance to release said shaft engaging means, means becoming effective to reengage said two shafts after the spring has turned the first shaft relative to the second shaft through a preset angle after which the constant speed of motor turns the shafts and cam back to their initial position.

7. A delayed circuit closer, having in combination, a switch controlling a load circuit fed from power lines, a cam carried by a shaft which in its initial position holds said switch closed, spring means adapted to turn the shaft and the cam backward away from its initial position opening said switch, a constant speed motor that operates when current is restored to the power lines, a disc driven by said motor in a forward direction, a plurality of pawls equally spaced around said disc, an escapement controlled mechanism that permits the disc to be turned backward only at a specified rate, a second disc carried by said shaft having a notch which any one of said pawls may engage to permit the motor to turn the second disc and cam toward its initial position, means becoming effective when the motor has stopped and the spring carries the notch backward at a controlled speed to release the engaging pawl whereupon the spring will turn the second disc on said shaft rapidly until the next pawl engages said notch, thus increasing the time required for the motor to restore the load switch by the time it takes the motor to turn the second disc and cam through the angle between said pawls.

8. A delayed circuit closer, having in combination, a switch supplying current from a main circuit to a load circuit, a cam carried by a shaft which in its first position holds said switch closed, a spring adapted to turn the shaft and the cam away from its initial position opening said switch, a constant speed motor that operates after current is restored to the circuit, a disc driven by said motor in one direction, a plurality of pawls equally spaced around said disc, an escapement controlled mechanism that permits the disc to be turned in the reverse direction only at a specified rate, a second disc on said shaft having a notch which any one of said pawls may engage to permit the motor to turn the cam toward its initial position, means becoming effective when the motor has stopped and the spring carries the notch backward at a controlled speed to release the one pawl that is engaging the second disc including a hinged tripper pawl so placed that the engaging pawl may push aside the tripper pawl when the motor is driving the disc carrying the pawls in one direction but on reverse movement of the disc the tripper pawl will disengage the one pawl engaging the second disc, whereupon the spring will turn the disc and said shaft rapidly until the next pawl engages said notch, thus increasing the time required for the motor to turn the cam back to restore the load switch by the time it takes the motor to turn the disc on said shaft through the angle between said pawls.

9. In a delayed circuit closer, a disc adapted to be turned in the forward direction at a fixed rate and backward at another fixed rate, a second coaxial disc adapted to be turned in the backward direction by a spring, a plurality of equally spaced devices on one of said discs, an element on the other disc that is normally engaged by any one of said devices, tripping means adjacent said devices which permits the devices to pass in the forward direction but which will disengage the particular device that is engaged to the element of the other disc when the motion is backward permitting the second disc to be turned through a set part of a circumference after which the next device will engage the element.

10. In a delayed circuit closer, a disc adapted to be turned in either direction at controlled speeds, a plurality of equally spaced pawls carried by said disc, a second coaxial disc having a single abutment with which any one of said pawls may engage, a spring tending to drive the second disc, a hinged tripper adjacent said discs which is pushed aside by the engaged pawl when the first disc drives the second disc in the direction to wind said spring but which moves said pawl out of engagement with the abutment when the pawl passes the hinged member in the opposite direction whereupon the spring will move the abutment toward the next pawl at an accelerating speed, a third disc moving with said second disc having a radial step, a bell crank one of whose arms forms a bumper that is engaged by said step bringing the second and third discs to rest with the abutment on the second disc just short of the next pawl on the first disc, engagement with a piece carried by the second disc which is engaged by the other arm of the bell crank to prevent the bumper from disengaging from the step, means permitting the inertia of the piece to move it through a limited arc relative to said second disc when the second disc is stopped by engagement of the bumper with the third disc into a position to free said arm of the bell crank, a spring seeking to turn said bell crank to move the bumper arm engaging the step on the third disc out of the path of said step when the piece in the second disc has released the other arm of the bell crank by moving radially relative to said disc allowing the spring to move the second disc to bring the abutment on the second disc into engagement with the next pawl on the first disc thus completing the movement of the second disc relative to the first disc through the angular distance between pawls without heavy impact of pawl and abutment.

11. In a delayed circuit closer, a disc adapted to be turned in either direction at controlled speeds, a plurality of equally spaced pawls carried by said disc, a second coaxial disc having a single abutment with which any one of said pawls may engage, a shaft on which the second disc is mounted, a spring tending to rotate the second disc backward, a hinged tripper adjacent said pawls which is pushed aside by the engaged pawl when the first disc drives the second disc forward but which moves said pawl out of engagement with the abutment when the pawl passes the hinged tripper in the backward direction whereupon the spring will move the second disc backward until the abutment comes into contact with the next pawl.

12. In a delayed circuit closer, a disc adapted to be turned in either direction at controlled speeds, a plurality of equally spaced pawls carried by said disc, a second coaxial disc having a single abutment with which any one of said pawls may engage, a spring tending to drive the second disc, a hinged tripper adjacent said discs which is pushed aside by the engaged pawls when the first disc drives the second disc in the direction to wind said spring but which moves said pawl out of engagement with the abutment when the pawl passes the hinged member in the opposite direction whereupon the spring will move the abutment toward the next pawl at an accelerating speed, a third disc moving with said second disc having a radial step, a bell crank one of whose arms forms a bumper that is engaged by said step bringing the second and third discs to rest with the abutment on the second disc just short of the next pawl on the first disc, a piece carried by the second disc which is engaged by the other arm of the bell crank to prevent the bumper from moving out of the path of the step until the third disc has almost brought the step into contact with the bumper, means to move the bumper out of the path of the step becoming effective when said piece has freed the other arm of the bell crank and moving the bumper at a speed that will not get the bumper out of the path of the step before the bumper has engaged said step, means permitting the spring to move the second disc after the bumper has moved out of the path of the step to bring the abutment on the second disc into engagement with the next pawl on the first disc thus completing the movement of the second disc relative to the first disc through the angular distance between pawls without heavy impact of pawl and abutment.

13. In a delayed circuit closer having a disc which is moved by a spring through an angle of less than one revolution into engagement with a stop and having means to absorb most of the impact of stopping the disc before it contacts the stop, in combination, a stop, a disc having a part adapted to strike said stop, a stressed spring tending to turn said disc to bring said part against said stop, an abutment movable with said disc, a bumper radially movable relative to the path of said abutment which is adapted to engage said abutment just before said part reaches said stop, a second spring seeking to move said bumper out of the path of said abutment, a ring having slots coaxially mounted on the disc, guiding pins on said disc extending into said slots and limiting the angular movement of the ring relative to the disc, a portion of said ring which prevents the bumper moving out of the path of the abutment when the ring lags as the stressed spring is accelerating the disc but permits the bumper to be moved out of the path of the abutment after the ring has coasted under the force of its inertia after the disc has come to a stop by the abutment striking the bumper, whereupon the second spring moves the bumper out of the way and the stressed spring moves said disc to bring said part into contact with the stop.

14. In a delayed circuit closer having a disc which is moved by a spring through an angle of less than one revolution into engagement with a stop and having means to absorb most of the impact of stopping the disc just before it contacts the stop, in combination, a stop, a disc having a part adapted to strike said stop, a stressed spring tending to turn said disc to bring said part against said stop, an abutment movable with said disc, a bumper radially movable relative to the path of said abutment which is adapted to engage said abutment just before said part reaches said stop, a second spring seeking to move said bumper out of the path of said abutment, a ring having slots coaxially mounted on the disc, guiding pins on said disc extending into said slots and limiting the angular movement of the ring relative to the disc, a portion of said ring which prevents the bumper moving out of the path of the abutment when the ring lags as the stressed spring is accelerating the disc until just before the bumper strikes the abutment and permits the bumper to be moved out of the path of the abutment after the disc has come to a stop by the abutment striking the bumper, permitting the spring to move the bumper out of the path of the abutment at a speed restricted by the inertia of the bumper that assures engagement of the bumper and the abutment before the second spring has moved the bumper out of its path.

15. A delayed circuit closer having, in combination, a switch adapted to close a circuit, a revolving cam adapted to close said switch, biasing means tending to turn said revolving cam backward at high speed to open said switch, current responsive means becoming effective after a current failure to turn a shaft carrying a disc forward at a very slow speed, a plurality of engaging devices spaced around said cam any one of which may engage the disc to enable the shaft to slowly turn the cam forward against the biasing means to close the switch, means becoming effective upon current failure to release the particular engaging device which is moving the cam forward to enable the biasing device to turn the cam backward at high speed to engage the next engaging device, means to absorb the impact of the cam moving backward at high speed with the stationary disc.

References Cited in the file of this patent

UNITED STATES PATENTS

| | | |
|---|---|---|
| 1,648,553 | Lotz | Nov. 8, 1927 |
| 2,120,787 | Lowkrantz | June 14, 1938 |
| 2,130,901 | Rankin | Sept. 20, 1938 |
| 2,342,816 | Peek | Feb. 29, 1944 |
| 2,548,604 | Hickey | Apr. 10, 1951 |
| 2,624,811 | Crimmins | Jan. 6, 1953 |
| 2,792,468 | Kozikowski | May 14, 1957 |

U. S. DEPARTMENT OF COMMERCE
PATENT OFFICE

CERTIFICATE OF CORRECTION

Patent No. 2,820,860                                                  January 21, 1958

Felix Kozikowski et al.

It is hereby certified that error appears in the printed specification of the above numbered patent requiring correction and that the said Letters Patent should read as corrected below.

Column 9, line 7, for "present" read --preset--; line 28, for "closeed" read --closed--; column 12, line 16, for "abument" read --abutment--.

Signed and sealed this 20th day of May 1958.

(SEAL)
Attest:

KARL H. AXLINE                                               ROBERT C. WATSON
Attesting Officer                                      Commissioner of Patents